(12) United States Patent
Curtis

(10) Patent No.: US 6,442,754 B1
(45) Date of Patent: Aug. 27, 2002

(54) SYSTEM, METHOD, AND PROGRAM FOR CHECKING DEPENDENCIES OF INSTALLED SOFTWARE COMPONENTS DURING INSTALLATION OR UNINSTALLATION OF SOFTWARE

(75) Inventor: Bryce Allen Curtis, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,370

(22) Filed: Mar. 29, 1999

(51) Int. Cl.[7] .............................................. G06F 9/445
(52) U.S. Cl. .................................. 717/175; 707/104.1
(58) Field of Search .............................. 717/11, 1, 175, 717/100; 707/203, 10, 104.1; 709/203, 221, 324; 710/104

(56) References Cited

U.S. PATENT DOCUMENTS

| | | | | |
|---|---|---|---|---|
| 5,325,533 A | * | 6/1994 | McInerney et al. | 717/107 |
| 5,499,357 A | * | 3/1996 | Sonty et al. | 710/104 |
| 5,721,824 A | * | 2/1998 | Taylor | 709/203 |
| 5,787,019 A | * | 7/1998 | Knight et al. | 709/324 |
| 5,933,646 A | * | 8/1999 | Hendrikson et al. | 717/169 |
| 5,966,540 A | * | 10/1999 | Lister et al. | 717/174 |
| 6,006,035 A | * | 12/1999 | Nabahi | 717/175 |
| 6,144,960 A | * | 11/2000 | Okada et al. | 707/10 |

OTHER PUBLICATIONS

Indigo Rose Software Design Corp. "Setup Factory 4.0" User's Guide, 1998.

* cited by examiner

Primary Examiner—Gregory Morse
Assistant Examiner—Hoang-Vu Antony Nguyen-Ba
(74) Attorney, Agent, or Firm—David W. Victor; Konrad Raynes Victor & Mann LLP

(57) ABSTRACT

Disclosed is a method, system, program, and data structure for installing a program onto a computer including an operating system. Dependency objects indicate a dependent component on which the program to install depends. The program processes the dependency objects before installing the program and determines an operating system command that is capable of determining whether the dependent component indicated in the dependency object is installed in the computer. The program then executes the operating system command to determine whether the dependent components indicated in the dependency objects are installed in the computer. An indication is made as to the dependent components that are not installed after determining that dependent components are not installed.

31 Claims, 7 Drawing Sheets

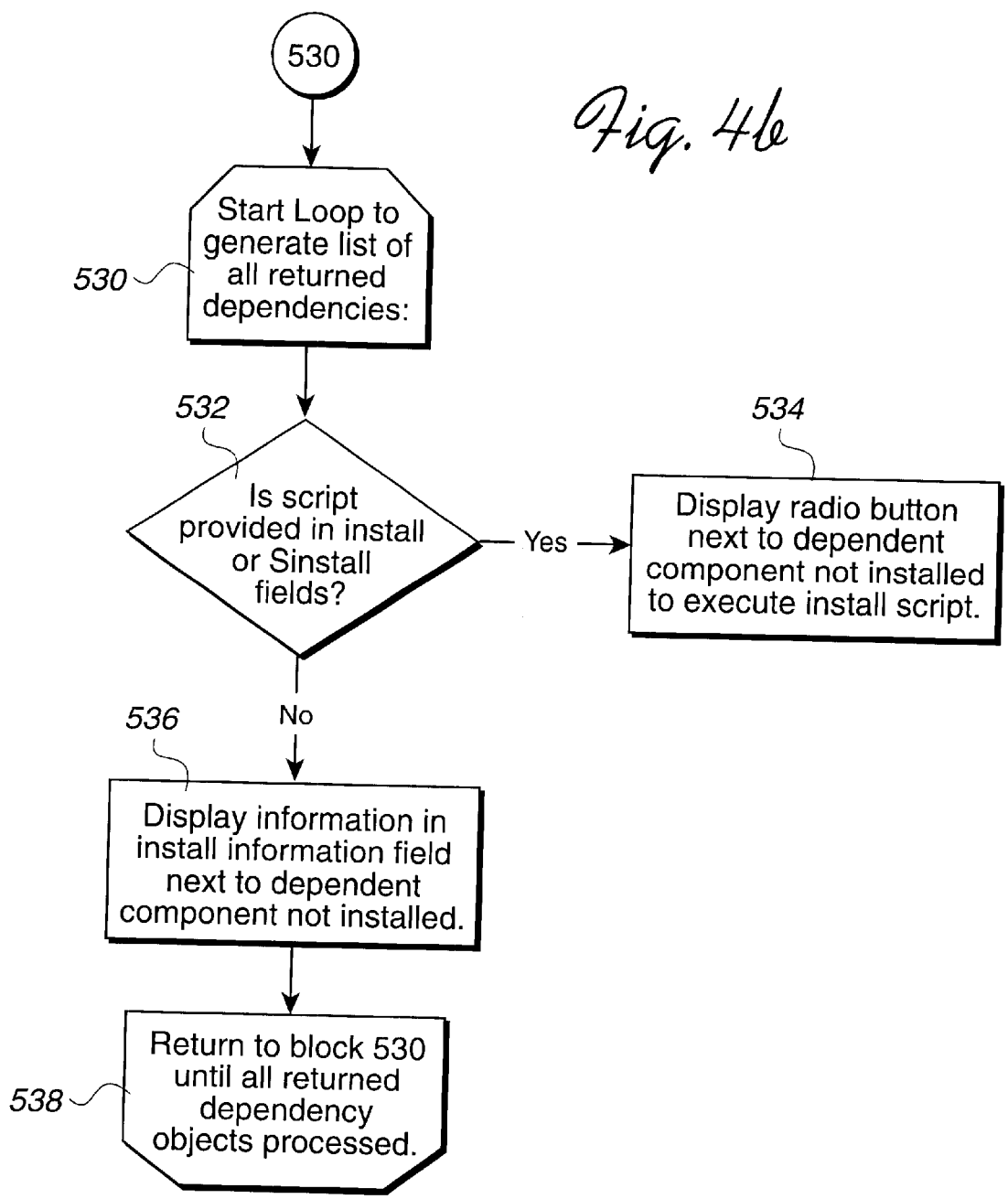

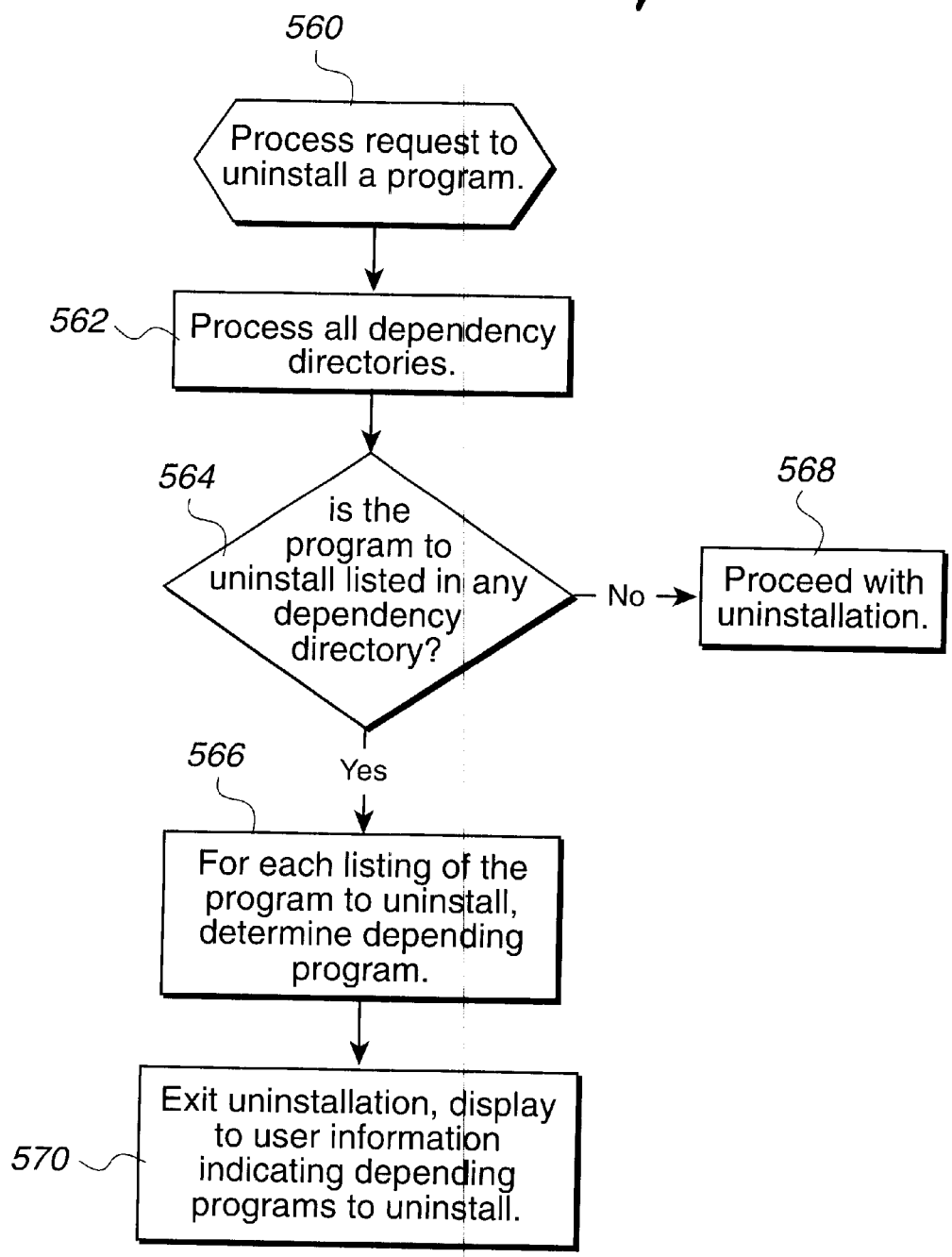

SYSTEM, METHOD, AND PROGRAM FOR CHECKING DEPENDENCIES OF INSTALLED SOFTWARE COMPONENTS DURING INSTALLATION OR UNINSTALLATION OF SOFTWARE

CROSS-REFERENCE TO RELATED APPLICATIONS

This application is related to the following co-pending and commonly-assigned patent applications, which applications were filed on the same date herewith, and which applications are incorporated herein by reference in their entirety:

"A Cross-Platform Program, System, and Method Having a Global Registry Object for Mapping Registry Equivalent Functions in an AIX Operating System Environment," having U.S. patent application Ser. No. 09/280,345;

"A Cross-Platform Program, System, and Method Having a Global Registry Object for Mapping Registry Equivalent Functions in an OS/2 Operating System Environment," having U.S. patent application Ser. No. 09/280,350; "A Cross-Platform Program, System, and Method Having a Global Registry Object for Mapping Registry Functions in a Windows Operating System Environment," having U.S. patent application Ser. No. 09/280,349;

"Global Registry Object for Mapping Registry Functions and Registry Equivalent Functions Across Multiple Operating Systems in a Cross-platform Program," having U.S. patent application Ser. No. 09/280,371;

"A Cross-platform Program, System, and Method Having a System Independent Registry for Use on Operating Systems Irrespective of a Registry Equivalent," having U.S. patent application Ser. No. 09/280,368;

"A System, Method, and Program for Enabling a Use of Property Object Having a Variable for a Property Value in a Cross-Platform Program," having U.S. patent application Ser. No. 09/280,344;

"A System, Method, and Program for Overriding Program Properties," having U.S. patent application Ser. No. 09/280,346;

"A System, Method and Program for Providing an Object-Oriented Install Architecture," having U.S. patent application Ser. No. 09/280,352;

"A System, Method, and Program for Automatic Error Detection While Utilizing a Software State Machine for Carrying out the Process Flow of a Software Program," having U.S. patent application Ser. No. 09/280,375;

"A System, Method, and Program for Utilizing a Software State Machine for Carrying Out the Process Flow of a Software Program," having U.S. patent application Ser. No. 09/280,376;

"A System, Method, and Program for Enabling a Software Program to Automatically Select a System-dependent Function," having U.S. patent application Ser. No. 09/280,369;

"A System, Method, and Program for Mapping a Global Object to Desktop Elements of Different Operating Systems," having U.S. patent application Ser. No. 09/280,374;

"A System, Method, and Program for Modifying a Text File," having U.S. patent application Ser. No. 09/280, 348;

"A System, Method, and Program for Updating Registry Objects With a Cross-platform Installation Program," having U.S. patent application Ser. No. 09/280,351;

"A System, Method, and Program For Preserving Background Settings During Install and Uninstall Operations," having Ser. No. 09/280,374;

"A System, Method, And Program for Modifying a Library Object," having Ser. No. 09/280,347;

"A System, Method, And Program For Installation on Drives Using a Drive Object," having U.S. patent application Ser. No. 09/280,353; and "A System, Method, and Program for Performing Program Specific Uninstall Operations," having U.S. patent application Ser. No. 09/280,373.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to a system, method, program, and data structure for installing and uninstalling programs and in particular for checking dependencies of installed components.

2. Description of the Related Art

An installer program is a software program that enables a programmer to write specific code to install a given application program onto the drives of a computer in a way that enables the given application program to work correctly with the computer's environment, including its operating system. There are several types of installers—Java installers and operating system specific installers, e.g., Microsoft Windows installers, and International Business Machines ("IBM") OS/2 and AIX operating system installers, etc. Many of the install programs existing today have various limitations in their functionality as discussed below.

One type of Java installer is provided by a software company known as InstallShield. Currently, the functionality and configurability of this Java installer is somewhat limited. For example, the Java installer provides default panels, but the text cannot be changed or configured. Also, this Java installer is not easy to customize. In other words, a programmer cannot easily add a function that is not provided by the installer program. In addition, the current Java installer provides only limited registry support. A registry is a central repository for all possible information for the computer such as hardware configurations and software settings, etc. The registry maintains information on installed components. A programmer or user can access the registry to determine information about installed products, based upon what the user/programmer placed into the registry or what information is useful to the user. Presently, the Java installer only works with a Microsoft Windows' registry; and the support provided with Microsoft Windows is limited. For example, the current Java installer does not enable the Windows' system registry to be updated directly. Instead, the keys to update in the registry are in a file which must be imported into the registry through a system call. It would be desirable if such a Java installer program supported multiple directories, splash screens (which are images that come up while a software product is being installed), and multiple languages instead of only English. Furthermore, it would be desirable for a given installer program to be more broadly applicable to other environments and operating systems. Although InstallShields' Java installer is tailored to Java, it is also geared somewhat for the Windows' operating system as discussed above in terms of the Windows' registry support provided. However, it does not provide specific support for other operating systems such as the IBM OS/2 and AIX operating systems.

Another Java installer is called "Install Anywhere" from ZeroG. This Java installer program also has a default panel that is not configurable, e.g., the order in which panels appear is not customizable. Likewise, registry support is limited. A user/programmer updates a registry from a file using a "reg_edit" command. Although this installer program enables a user/programmer to add a few items into the registry, the registry cannot be queried. In addition, other registry functional features are not available. Likewise, there is no multiple directory support, and no national language support. Also, it does not support multiple operating systems, i.e., there is no OS/2 or AIX specific support.

Another approach would be to provide install APIs for Java. However, this approach is not yet available.

With respect to operating system specific installers, InstallShield provides a Microsoft Windows' 32 installer, e.g., Microsoft Windows 95/98 and NT. Although this installer program is widely used throughout the industry, it is based upon a proprietary scripting language developed by InstallShield. The scripting language is similar to Basic programming language. Programmers, who generally have experience and knowledge of object oriented programs such as C++ and Java, must learn this proprietary InstallShield script, which is not related to the popular computer languages, in order to program an Install program. This unfamiliarity with the proprietary InstallShield scripting language complicates the installer programming process.

Moreover, each operating system provides different techniques to track installed programs and their dependencies. A dependency indicates a program that another program needs in order support all functions. A depending program is a program that requires the installation of a dependent program to implement all the depending programs features and functions. Thus, there is a need in the art for a system for checking dependencies that can be used across operating systems, including with those operating systems that currently do not check whether dependent components are installed when installing a program.

SUMMARY OF THE PREFERRED EMBODIMENTS

To overcome the limitations in the prior art described above, preferred embodiments disclose a system, method, program, and data structure for installing a program onto a computer including an operating system. Dependency objects indicate a dependent component on which the program to install depends. The program processes the dependency objects before installing the program and determines an operating system command that is capable of determining whether the dependent component indicated in the dependency object is installed in the computer. The program then executes the operating system command to determine whether the dependent components indicated in the dependency objects are installed in the computer. An indication is made as to the dependent components that are not installed after determining that dependent components are not installed.

In further embodiments, the dependency object is capable of including an install script to install the dependent component onto the computer. In such case, a determination is made as to whether the dependency object that includes dependent components that are not installed in the computer includes install script. The install script is enabled after it is determined that the dependency object includes install script. A user may select to execute the enabled install script to install the dependent component.

In still further embodiments, the program is installed after processing the dependency objects and determining that the dependent components are installed in the computer. After installing the program, an indication of the installed program is made in a data structure. The dependency objects are then processed to determine the dependent components from which the installed program depends. An indication is made in the data structure of those dependent components determined from the dependency objects for the installed program. This data structure may be used when removing an installed program to determine whether the installed program to remove is indicated as a dependent component. If so, the data structure is used to locate depending programs that depend upon the dependent components to operate in at least one respect. The installed program cannot be removed until the determined depending programs are removed.

Preferred embodiments provide a data structure and program for determining whether all dependent components are installed before installing a depending program which needs the dependent components installed to perform all functions. Preferred embodiments further provide mechanisms for installing the dependent components not installed in order to allow the installation of the depending program that requires that the dependent components be installed. These mechanisms used to maintain information and determine dependencies may further be used during removal of a program to insure that programs are not removed that are dependent components from which other installed programs depend.

With preferred embodiments, the dependency object may be used across operating systems to check dependencies for all operating systems on which the install program operates. In this way, the dependency object is part of the cross-platform capabilities that allow the installer program to install products on different operating system platforms.

BRIEF DESCRIPTION OF THE DRAWINGS

Referring now to the drawings in which like reference numbers represent corresponding parts throughout:

FIG. 6 illustrates logic implemented in the install program to uninstall a program.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
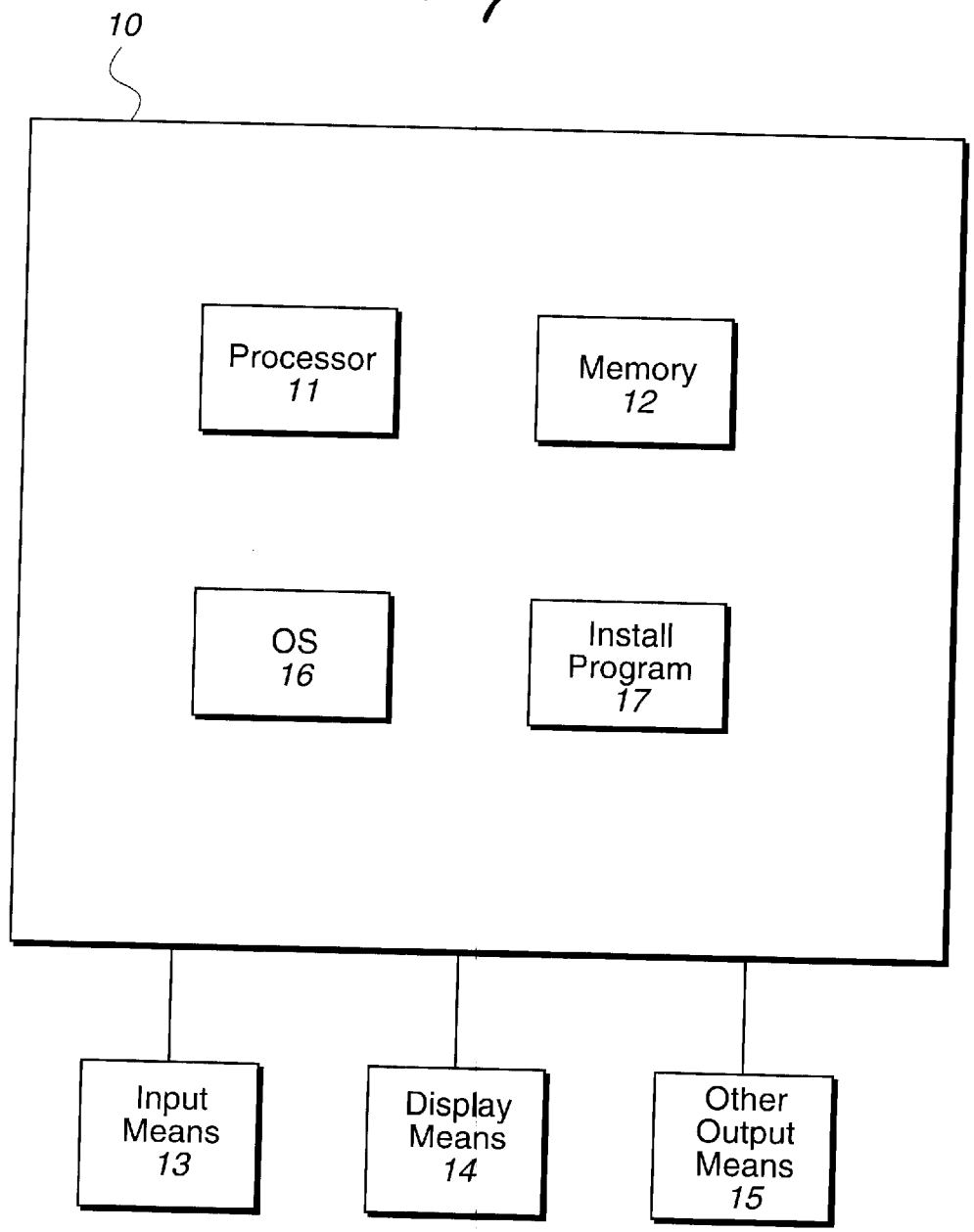
FIG. 1 is a block diagram illustrating a software and hardware environment in which preferred embodiments of the present invention are implemented.

With reference to FIG. 1, a block diagram of a data processing system 10, i.e., computer system, in which a preferred embodiment of the present invention may be implemented is depicted. The computer includes a processor 11 and memory 12. The computer 10 may be, but is not limited to, a personal computer, workstation, or a mainframe. The computer system also includes input means 13 such as a keyboard and/or mouse and/or track ball and/or light pen and/or pen-stylus and/or voice-sensitive device and/or touch-sensitive device, and/or other pointing devices and/or other input means. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed.

The programs in memory 12 includes an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Figure 2:
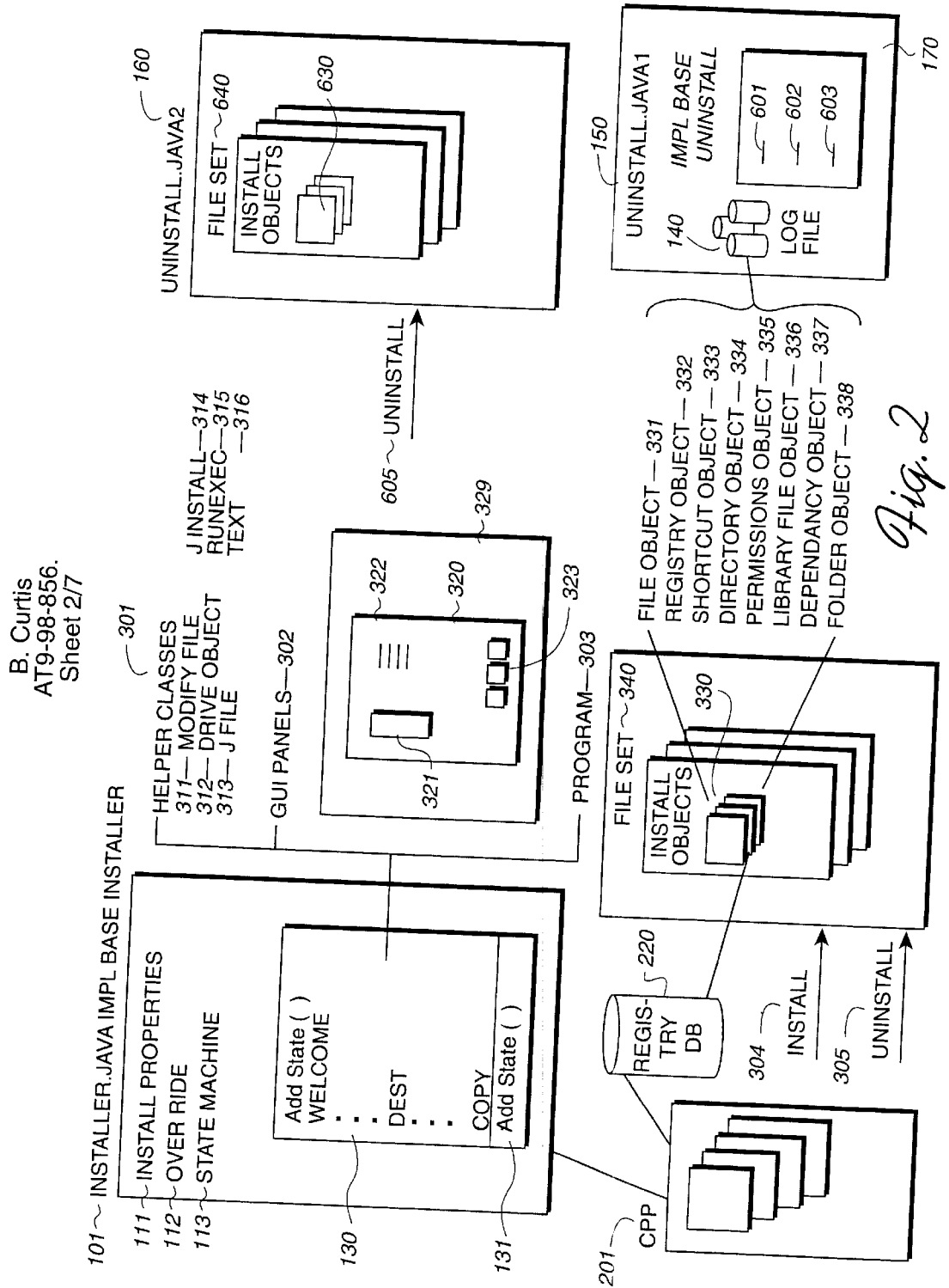
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installerjava", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Directory 170 can be thought of as a container just like the program directory 303 is a container for the file set 340 and install objects 330.

"Uninstalljava2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

There are certain platform specific operations that are taking place throughout the different objects, i.e., the helper classes 301, install objects 330, etc. Therefore, there is a platform specific module/interface. It is referred to herein as CPP 201. It defines a set of methods, that are representative of different operating systems, for functions that need to take place for an install. There are several different CPPs 211, 212, 213, . . . 219, etc., one for each operating system. For example, CPP Win 32, CPP OS/2, CPP Solaris, CPP Linux, and CPP AIX. There is also a CPP default. If the operating system is not implemented through a CPP, the CPP default is used. This CPP 201 is the platform specific code for the installer.

Since most platforms, i.e., operating systems, do not have a registry, a platform independent registry database class 220 is created which ties the platform specific code 201 with registry objects 332. The registry database 220 implements the registry function for those platforms which do not have a registry.

The installer tool kit of the preferred embodiment of this invention supports the Windows 32 operating systems including Windows 95, Windows 98and NT 4.0. It also supports OS/2 Warp 4.0, OS390, AIX 4.1 and higher versions, Solaris and Linux 4.2. Although the structure of the preferred embodiment enables support for any given operating system or environment, future embodiments or further enhancements to the present preferred embodiment will enable full support for other operating systems such as NT 5.0, HP-UX, AS/400, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

Other functions of the tool kit include i) providing install property objects that contain variables as values that become defined for a specific operating environment; ii) enabling a property value to be temporarily overridden; iii) a software state machine that enables a programmer to easily customize an install program by merely adding, deleting, or changing the various states that contain the functions and flow of control of the program; iv) automatically detecting a programming error if a programmer incorrectly specifies a non-existent state within the state machine; v) automatically selecting a system-dependent function; vi) a containment structure consisting of program object, fileset objects, install objects, where each fileset object and install object contains means to install and uninstall itself and to log itself; vii) enabling the management of folders, shortcuts and icons; viii) enabling environment variables to be read, created, modified and deleted; ix) providing dependency checking of prerequisite programs during both install and uninstall; and x) providing various logs, e.g. a log for keeping track of what is being installed, and a log that reports the progress of install. Logs are used for both the install and uninstall process. Furthermore, these logs are human readable which allows them to be checked, e.g., after a silent install, to ensure that a file has installed successfully. The tool kit also enables multiple destination directories to be installed from multiple source directories. For example, there can be multiple components of file sets included in an install where a file set is a separately installable/uninstallable piece of code or set of files.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Other features include a) a progress bar that shows the status during an install, b) splash screens which can be displayed during an install, c) national language support, d) the ability to perform unattended install from install scripts, and e) an install wizard. There are also twenty or so defining default panels that are available. It is also easy for a programmer to add a programmer's own panels without a lot of effort.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

The Dependency Object

Figure 3:
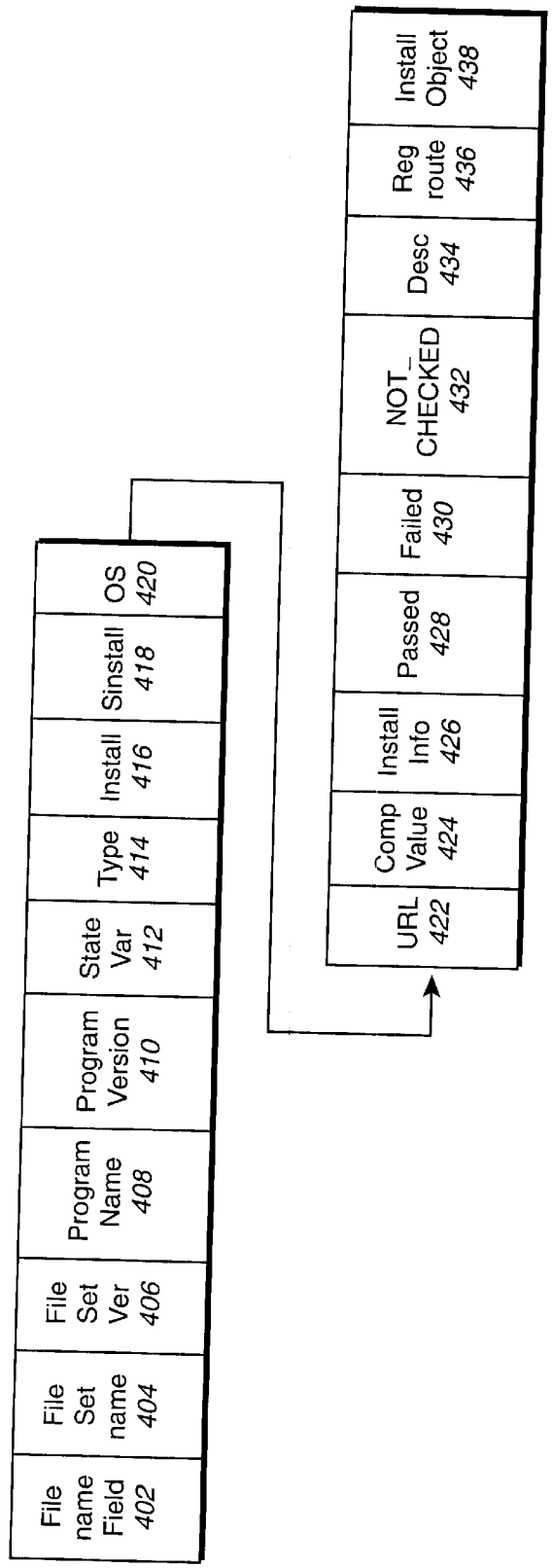
FIG. 3 illustrates the fields in a dependency object in accordance with preferred embodiments of the present invention.

FIG. 3 illustrates the fields within a dependency object data structure 400 in accordance with preferred embodiments. The dependency object data structure 400 includes the following fields: filename 402; file set name 404; file set version 406; program name 408; program version 410; state variables 412; type 414; install 416; SInstall 418; OS (for Operating System) 420; URL (for Universal Resource Locator) 422; Comp_Value 424; Install Info 426; Passed 428; Failed 430; NOT_CHECKED 432; desc 434; registry route 436; and install object 438.

The dependency object 400 is used during install and uninstall operations to determine whether any files or programs upon which the program to install needs in order to operate are installed and determine whether any programs to uninstall are required by already installed programs. As used herein, the term "depending program or file" refers to a program or file that depends on the installation of another program to operate in full, and the term "dependent program or file" refers to a program or file which must be installed in order for the depending program to perform all intended functions.

The developer generates the dependency object 400 when creating the file set 34 using construction methods that are methods of the dependency object class. Multiple dependency objects 400 may be added to a file set 34 for each file, program or registry entry within the registry file that is needed for the installed program to operate. A separate construction class is used for each type of dependency object 400, i.e., a file, program, or registry object. Dependency objects 400 are inserted into file sets 340 to determine whether the files, programs and/or registry entries that the installed file set needs to operate are already installed on the system. In preferred embodiments, there are separate constructors for each type of dependency that may be checked, e.g., file set, program, registry entry, to create a dependency object for the dependency to be checked.

The filename field 402 indicates the name of a dependent file and is used when the dependency object 400 is checked to determine whether a file is installed. If this field is empty, then the dependency object does not check for a file. The file set name 404 and file set version 406 fields indicate a file set name and version included within the program identified by the program name 408 and version 406 fields. The file set includes separate components of the program object. The install field 416 includes script of an install program to execute in case the file, program or registry entry indicated in the dependency object 400 is not installed. The SInstall field 418 indicates a silent install program which installs the determined file set or program not installed. The SInstall field 418 may further pass a response file to the install program 17 including information used to control the installation. In this way, the user need not enter any information during a silent installation as such information is provided through the Response file. The options provided with the Response file may include parameters which the user previously answered during the installation process. The response file options are built with knowledge of the sequence of events during the installation of the file or program in the dependency object.

The OS 420 field indicates the operating system in which the dependency object 400 will be executed to check for dependencies, i.e., the system OS 16. The URL 422 field indicates a URL of where to download the dependent file or program when running the install script. The Type field 414 indicates the type of dependency being checked, i.e., file, program, file set or registry object. The state variables 412 indicate whether the dependency object 400 applies to a particular operating system. The Comp_Value 424 field is used in the event the Type 414 is a registry object. When the Type field 414 indicates a registry object, a determination is made as to whether a an entry in the registry file, referred to as a registry entry, matches a value in the Comp_Value 424 field. The Comp_Value 424 can be used to check equal, greater, less than, etc. The install info 426 field includes information on where to obtain a file to install if install script is not provided in the Install 416 or SInstall 418 fields.

The dependency object 400 also includes state variables Passed 428, Failed 430, and NOT_CHECKED 432 fields, which are set to indicate the state of the dependency object 400, i.e., whether dependency object 400 has passed, failed or not been checked. When the dependency object is first processed, the NOT_CHECKED field 432 is set to "off." If the dependent component of the dependency object 400 is installed in the system, then the Passed field 428 is set "on;" otherwise, the Failed field 430 is set "on." In this way the dependency object 400 would maintain information on previous processing efforts. Only after the Passed field 428 is set "on" in all the dependency objects in the file set 340 being installed may the file set be installed. If any dependency objects 400 in a file set have the failed field 430 set "on," then the file set may not be installed because the dependent component is not installed.

The description ("desc") field 434 provides a written description of the dependency. The description in the field 434 is displayed to the user if the dependency is not satisfied. The description information may list the name of the dependent component(s) not installed. A registry route field 436 is the location or dependency directory in the registry file or object where the dependency information is saved. An install object 438 variable indicates the registry entry in the registry file that is the dependent component. Just as the filename field 402 maintains the name of a file which is a dependent component, the install object 438 maintains the registry entry dependent component, when the subject of the dependency object 400 is a registry entry.

In alternative embodiments, dependency objects may be implemented with more or less of the fields described above without departing from the scope of the invention. Moreover, the dependency object 400 may be implemented using programming and data structure techniques known in the art.

In preferred embodiments, as part of the installation process, a check_dependency program is executed before the objects in a particular file set are installed. The check_dependency program checks every dependency object in the file set to install. The check_dependency program is part of the CPP modules 201 as it includes native operating system commands to check whether the file, program or registry object indicated in the dependency object 400 is installed on the system. In this way, the check_dependency program utilizes commands within the OS 16 on which the installation is being made. Because the dependency object 400 can be utilized by CPP modules 201 for different operating systems, the dependency object 400 may be used across operating system platforms. The installation program developer need only write a single dependency object 400 which may then be used by the different CPP modules 201 when installing the program on the particular operating system corresponding to the CPP module 201 being called.

Installation Using Dependency Objects

Figure 4A:
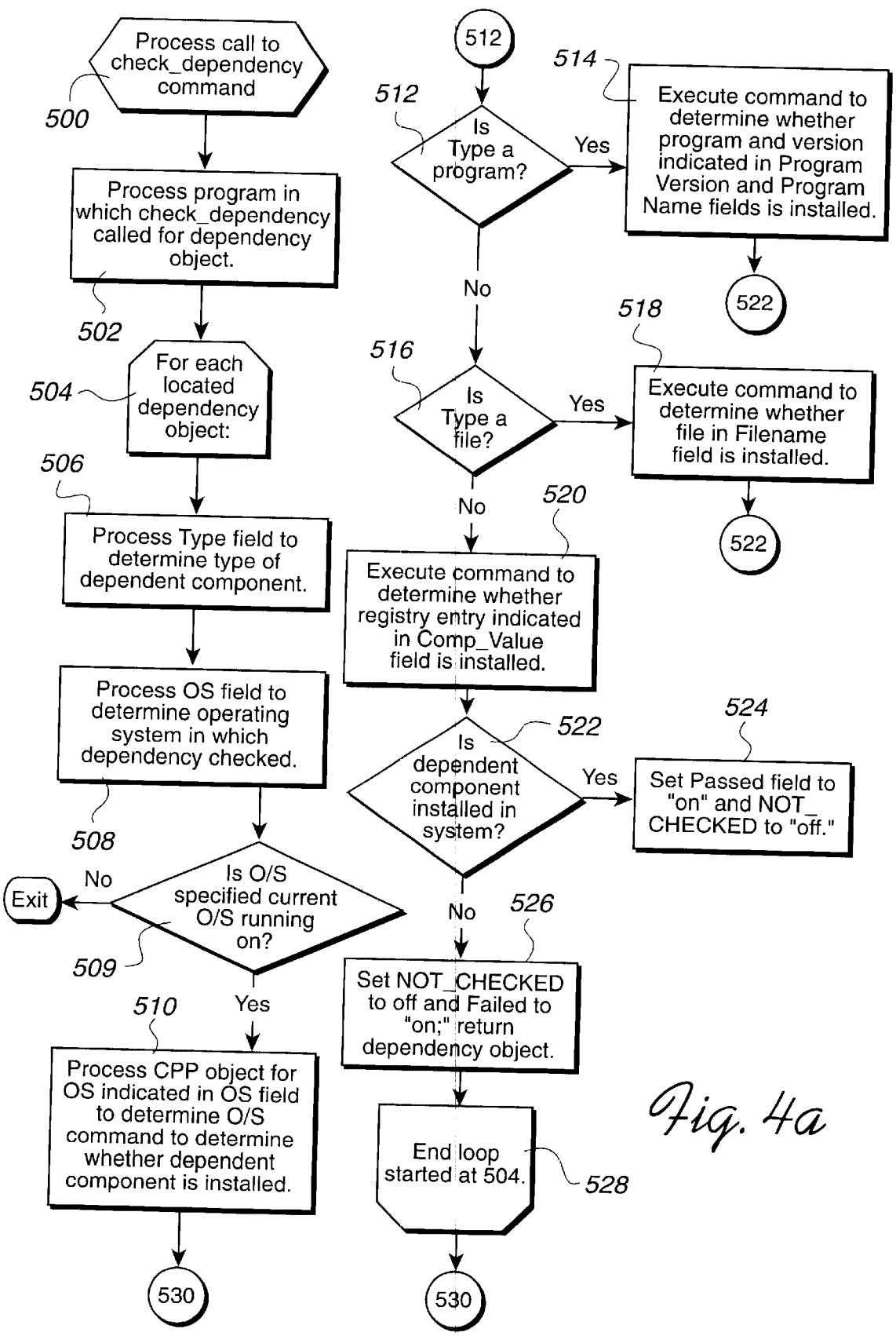
FIGS. 4a, b illustrate logic implemented in the install program to check dependencies using the dependency object in accordance with preferred embodiments of the present invention.

FIGS. 4a, b illustrate logic implemented in the install program 17, in an object oriented computer language, e.g., Java, C++, etc. The logic of FIGS. 4a, b is implemented by a call to the check_dependency function, which is a function in the class Dependency Object that includes data and methods of the class Dependency Object. There may be a check_dependency function in each CPP module 201 specific to an operating system to handle the dependency checking for that specific operating system. This function determines whether the file, program or registry object indicated in the dependency object 400 is installed on the computer. Control begins at block 500 where the install program 17 processes a call to the check_dependency function within the CPP module 201 for the operating system on which the program is being installed. This function is executed before a file set 340 is installed. Control transfers to block 502 where the check_dependency function processes the File Set 304 at which the call was made to the check_dependency function. Control transfers to block 504 which is the start of the loop that iterates for each dependency object located in the processed File Set 304. The loop starts at block 506 where the check_dependency function processes the Type field 414 to determine the type of dependent component being checked, e.g., file, program, registry object. The check_dependency function then processes (at block 508) the OS field 420 to determine the operating system in which the dependency is being checked, i.e., the operating system on which the install program 17 is executing. If, at block 509, the operating system (O/S) specified in the O/S field 420 does not match the operating system on which the install program 17 is executing, then the check_dependency function sets the state to skip, and proceeds to block 530. Otherwise, control transfers to block 510 to process the CPP object in the CPP 201 for the operating system indicated in the OS field 420 to determine the operating system command to use to check whether the dependent component is installed. For instance, the Windows operating system has an uninstall key which is used to search the registry file to determine whether a program is installed on the computer. Other operating systems include a data base similar to the registry program that indicates the installed components. Alternatively, the check_dependency function may utilize a registry database 220 to maintain information typically maintained in a registry file.

Control transfers to block 512 where the check_dependency function determines whether the Type field 414 indicates the type as a program. The check_dependency function may call a method in the Dependency Object class to obtain the type information, e.g., getType( ). If so, control transfers to block 514 to execute the native operating system command determined at block 510 to determine whether the program and version indicated in the Program Name 408 and Program Version 410 fields is installed in the system 10. The registry object may be searched to determine whether a program is installed. As discussed, information on installed components is added to a registry file, e.g., registry 220, when the components are installed. If the Type 414 is not a program, then control transfers to block 516 where the check_dependency function determines whether the Type 414 field indicates that the type is a file. If so, control transfers to block 518 where the check_dependency function executes the native operating system command determined at block 510 to determine whether a file having the name indicated in the Filename field 402 is installed in the system. Otherwise, if the type is not a file, the type indicated in the Type field 414 must be a registry entry in a registry object. If the type is a registry entry, then control transfers to block 520 where the check_dependency function executes the command determined at block 410 to determine whether the registry entry in the file matches the registry object value indicated in the Comp_Value 424 field.

After executing the command at block 514, 518 or 520, a determination is made as to whether the dependent component is installed in the system 10. If so, control transfers to block 524 to set the Passed field 428 to "on" and NOT_CHECKED 432 to "off." Otherwise, control transfers to block 526 where the program logic sets the Failed field 428 to "on" and NOT_CHECKED 432 to "off," and returns the dependency object 400. Control transfers to block 528 to perform another iteration of the loop until all dependency objects 400 in the File Set 340 are processed. After all dependency objects are processed, control transfers to block 530 in FIG. 4b if dependency objects were returned. The logic of FIG. 4b may be implemented within the install program 17 after receiving returned dependency objects from the check_dependency function. Block 530 represents the beginning of a loop to generate a list from the information maintained in the description ("desc") field 434 of all returned dependency objects to display to the user, indicating dependent components that must be installed before the depending program may be installed. For each returned dependency object, control transfers to block 532 where the install program 17 determines whether an install script is provided in the Install 416 or SInstall 418 fields. If so, control transfers to block 534 where the program displays on the display means 14 the name of the dependent component that was not located on the system and a radio button to allow the user to selectively cause the execution of the install scrip in the Install 416 or SInstall 418 fields. If there is not install script, then control transfers to block 536 where the program displays information maintained in the install information field 426 to inform the user on where to obtain the dependent component that is needed before the program may be installed. From block 534 or 536 control transfers to block 538 to perform another iteration of the loop until all returned dependency objects are processed. If there were no returned dependency objects, then the program may be installed without performing the loop at blocks 530 through 538.

When the user selects to install the file, the install program 17 will execute the install script in either the Install 416 or SInstall field 418. If the install script requires retrieval of a file from a URL location, then the install program 17 may obtain the URL location from the URL field 422 using another method function, e.g., getURL( ), and install the file obtained from the URL location. During execution of install script from the Install field 416, the install program 17 may prompt the user for installation options. During execution of install script from the SInstall field 418, the program may pass a Response file to the installation program to set options from the response file instead of requesting user input.

Use of Dependency Information During Uninstallation

During installation of a program and file sets, information is written to the registry file on the programs installed.

During installation of a dependent program, dependency information from the Dependency Object 400 may be written to a dependency location indicating dependent components of the installed file. In this way, before uninstalling a program, a determination may be made as to whether other installed components depend on the file being uninstalled.

Figure 5:
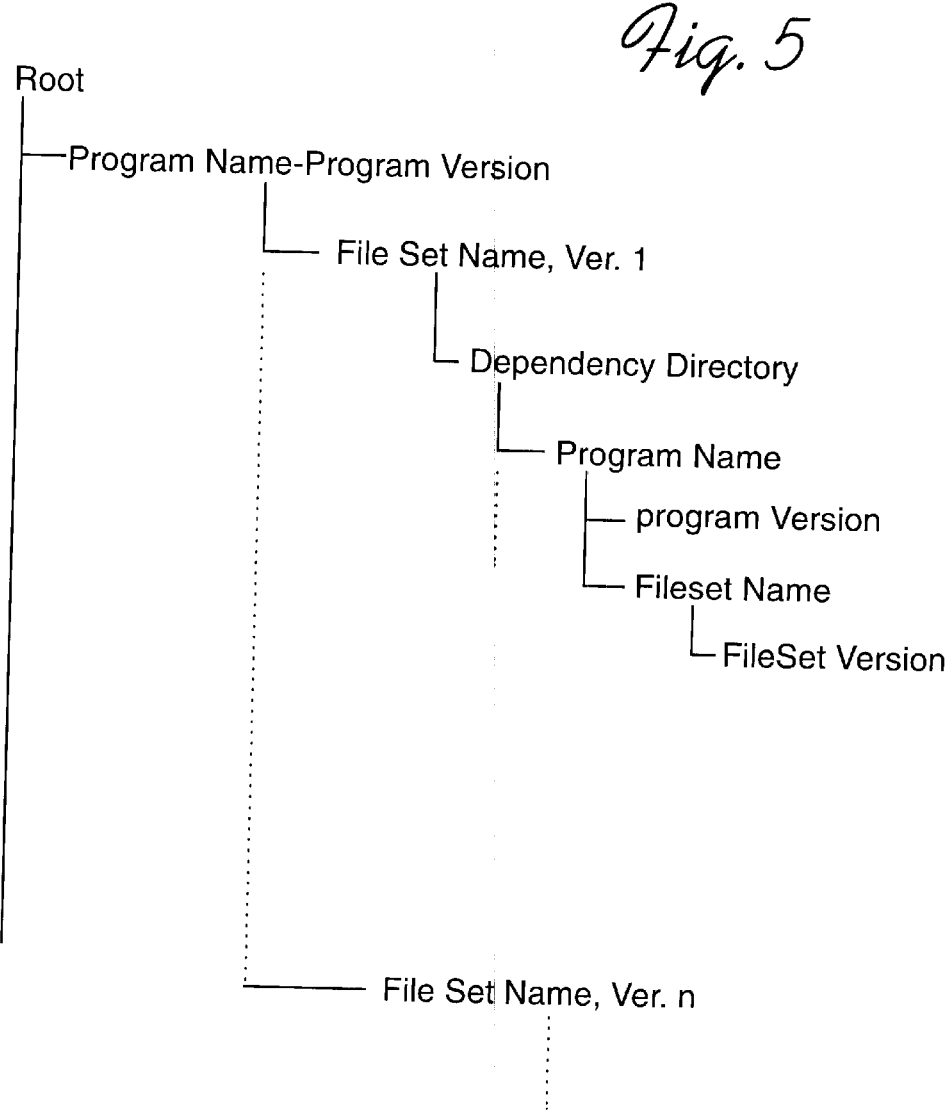
FIG. 5 illustrates a diagram of a data structure indicating installed components and their dependencies in accordance with preferred embodiments of the present invention.

FIG. 5 illustrates a data structure, which in preferred embodiments is maintained in the registry object or registry database 220, indicating installed programs and dependent components on which installed programs depend. In the embodiment of FIG. 5, the data structure is a hierarchical arrangement of programs, file sets, and dependent components in the form of a directory tree. A root directory includes a sub-directory for each installed program, indicating the program name and version. Each installed program includes a next level subdirectory for each file set of the installed program, indicating the file set name and version. Each installed file set component has a Dependency subdirectory which includes information on each dependent component on which the file set and program depend in order to operate. The dependency subdirectory would list the program name, version, fileset name, and fileset version for each program on which the fileset including the dependency subdirectory depends. The registry route 436 in the dependency object 400 indicates the location of the dependency directory in the registry file where the dependency information for a particular dependency object is maintained.

The information in this directory is created whenever a component is installed. For instance, whenever a program is installed, a subdirectory is created under the root directory. The registry route 436 is used to determine the dependency directory of where to write dependency information when the program is installed. In further embodiments, the dependency directory may indicate dependent file sets or registry objects that are the subject matter of the processed dependency object. If there are no dependent components, then the dependency directory will contain no values. Whenever a program is installed as a result of the execution of the install script in the Install 416 and SInstall 418 fields, a subdirectory would be created in the root directory for the installed dependent component. During installation, after the program is installed and all dependency objects are processed and the Passed field 428 is "on," the program may indicate values in the Dependency directory by processing all the passed dependency objects in the installed file set and writing the program name and version indicated in the dependency object fields 408 and 410 to the dependency directory.

FIG. 6 illustrates logic implemented in a program that is executed during the uninstallation of a program from the system. At block 560, the program processes a request to uninstall a program. Control transfers to block 562 where the program processes all the dependency directories. At block 564, the program determines whether the program to uninstall is listed as a value in any of the dependency directories. If so, control transfers to block 566; otherwise, control transfers to block 568 to proceed with the uninstallation. At block 566, the program determines the depending program in each instance of the program to uninstall listed in a dependency directory. The uninstall program may navigate the directory structure from the dependency directory shown in FIG. 5 to determine dependant programs that depend on the program subject to the uninstallation. Control then transfers to block 570 to exit uninstallation and display to the user on the display means 14 information indicating the depending programs that should be uninstalled before continuing with the uninstallation of the program, which is a dependent program. In this way, a dependent program will not be removed to render depending programs still installed inoperable in any manner.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments of the install program 17 and install kit were described as implemented in the Java programming language. However, any other object oriented programming language or other programming language may be used to implement the install program 17 and provide the user with tools to develop an install script.

In preferred embodiments, the dependency object was used to determine the installation of three types of structures, files, programs or registry objects. In further embodiments, the dependency object may be used to check for the installation of other types of objects and install such other objects.

Preferred embodiments were described with respect to a registry object and hierarchical data structure, such as shown in FIG. 5, to maintain information on installed components and dependencies. However, those skilled in the art will appreciate that the present invention may apply to alternative types of indexes and database structures that are used to maintain information on installed components.

In summary, preferred embodiments disclose a system, method, program and data structure for installing a program onto a computer including an operating system. Dependency objects indicate a dependent component on which the program to install depends. The program processes the dependency objects before installing the program and determines an operating system command that is capable of determining whether the dependent component indicated in the dependency object is installed in the computer. The program then executes the operating system command to determine whether the dependent components indicated in the dependency objects are installed in the computer. An indication is made as to the dependent components that are not installed after determining that dependent components are not installed.

The foregoing description of the preferred embodiments of the invention has been presented for the purposes of illustration and description. It is not intended to be exhaustive or to limit the invention to the precise form disclosed.

Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for installing a program onto a computer including an operating system, comprising:
   providing a dependency object indicating a dependent component on which the program to install depends;
   processing the dependency object before installing the program;
   determining an operating system in which the program is being installed;
   determining an operating system command from a plurality of operating system commands for different operating systems that is capable of executing in the determined operating system;
   executing the operating system command to determine whether the dependent component indicated in the dependency object is installed in the computer; and
   indicating that the dependent component is not installed after determining that the dependent component is not installed.

2. The method of claim 1, wherein the dependency object is capable of including an install script to install the dependent component onto the computer, further comprising:
   determining whether the dependency object that includes the dependent component that is not installed in the computer includes install script; and
   enabling the install script after determining that the dependency object includes install script, wherein a user may select to execute the enabled install script to install the dependent component.

3. The method of claim 2, wherein the dependency object is further capable of including a universal resource locator (URL), further comprising:
   accessing a file at the URL when executing the install script; and
   installing the file from the URL on the computer.

4. The method of claim 2, wherein the dependency object is further capable of including install information, further comprising:
   determining whether install script is included in the dependency object, wherein the enabling of the install script occurs after determining that the install script is included in the dependency object; and
   processing the install information to present the install information to a user after determining that the dependency object does not include install script.

5. The method of claim 1, wherein a plurality of dependency objects are provided for indicating a plurality of dependent components on which the program to install depends, further comprising:
   installing the program and file sets therein after processing the dependency objects and determining that the dependent components are installed in the computer;
   indicating in a data structure the installed program;
   processing the dependency objects to determine the dependent components from which the installed program depends; and
   indicating in the data structure the dependent components determined from the dependency objects for the installed program.

6. The method of claim 5, further comprising:
   processing a command to remove the installed program from the computer;
   processing the data structure to determine whether the installed program to remove is indicated as a dependent component;
   determining from the data structure depending programs that depend upon the dependent components to operate in at least one respect; and
   indicating that the installed program cannot be removed until the determined depending programs are removed.

7. The method of claim 6, further comprising continuing with the removal of the installed program after determining that the installed program is not a dependent component for another installed program.

8. The method of claim 1, wherein the dependency object further includes an operating system field indicating the operating system on which the program will be installed, wherein the determined operating system command depends upon the operating system indicated in the operating system field, and wherein executing the operating system command further comprises passing data from the dependency object to the operating system command as parameters, dependent on the type of operating system indicated in the operating system field.

9. A system for installing a program, comprising:
   a computer including an operating system;
   a computer monitor;
   a memory device storing a dependency object indicating a dependent component on which the program to install depends;
   program logic executed by the computer in communication with the computer monitor and the memory device, comprising:
      (i) means for processing the dependency object before installing the program;
      (ii) determining an operating system in which the program is being installed;
      (iii) means for determining an operating system command from a plurality of operating system commands for different operating systems that is capable of executing in the determined operating system;
      (iv) means for executing the operating system command to determine whether the dependent component indicated in the dependency object is installed in the computer; and
      (v) means for indicating that the dependent component is not installed after determining that the dependent component is not installed.

10. The system of claim 9, wherein the dependency object is capable of including an install script to install the dependent component onto the computer, wherein the program logic further comprises:
    means for determining whether the dependency object that includes the dependent component that is not installed in the computer includes install script; and
    means for enabling the install script after determining that the dependency object includes install script, wherein a user may select to execute the enabled install script to install the dependent component.

11. The system of claim 10, wherein the dependency object is further capable of including a universal resource locator (URL), wherein the program logic further comprises:

means for accessing a file at the URL when executing the install script; and means for installing the file from the URL on the computer.

12. The system of claim 10, wherein the dependency object is further capable of including install information, wherein the program logic further comprises:

means for determining whether install script is included in the dependency component, wherein the enabling of the install script occurs after determining that the install script is included in the dependency component; and means for processing the install information to present the install information to a user after determining that the dependency component does not include install script.

13. The system of claim 9, wherein the memory device includes a plurality of dependency objects that are provided for indicating a plurality of dependent components on which the program to install depends, wherein the program logic further comprises:

means for installing the program after processing the dependency objects and determining that the dependent components are installed in the computer;

means for indicating in a data structure stored in the memory device the installed program;

means for processing the dependency objects to determine the dependent components from which the installed program depends; and means for indicating in the data structure the dependent components determined from the dependency objects for the installed program.

14. The system of claim 13, wherein the program logic further comprises:

means for processing a command to remove the installed program from the computer;

means for processing the data structure to determine whether the installed program to remove is indicated as a dependent component;

means for determining from the data structure depending programs that depend upon the dependent components to operate in at least one respect; and means for indicating to a user that the installed program cannot be removed until the determined depending programs are removed.

15. The system of claim 14, wherein the program logic further comprises means for removing the installed program after determining that the installed program is not a dependent component for another installed program.

16. The system of claim 9, wherein the dependency object further includes an operating system field indicating the operating system on which the program will be installed, wherein the determined operating system command depends upon the operating system indicated in the operating system field, and wherein the program logic further includes means for passing data from the dependency object to the operating system command as parameters, dependent upon the type of operating system indicated in the operating system field.

17. An article of manufacture for use in programming a computer system to install a program, the article of manufacture comprising computer useable media accessible to the computer system, wherein the computer usable media includes at least one computer program that is capable of causing the computer system to perform:

providing a dependency object indicating a dependent component on which the program to install depends;

processing the dependency object before installing the program;

determining an operating system in which the program is being installed;

determining an operating system command from a plurality of operating system commands for different operating systems that is capable of executing in the determined operating system;

executing the operating system command to determine whether the dependent component indicated in the dependency object is installed in the computer; and indicating that the dependent component is not installed after determining that the dependent component is not installed.

18. The article of manufacture of claim 17, wherein the dependency object is capable of including an install script to install the dependent component onto the computer, further capable of causing the computer system to perform:

determining whether the dependency object that includes the dependent component that is not installed in the computer includes install script; and enabling the install script after determining that the dependency object includes install script, wherein a user may select to execute the enabled install script to install the dependent component.

19. The article of manufacture of claim 18, wherein the dependency object is further capable of including a universal resource locator (URL), further capable of causing the computer system to perform:

accessing a file at the URL when executing the install script; and installing the file from the URL on the computer.

20. The article of manufacture of claim 18, wherein the dependency object is further capable of including install information, further capable of causing the computer system to perform:

determining whether install script is included in the dependency object, wherein the enabling of the install script occurs after determining that the install script is included in the dependency object; and processing the install information to present the install information to a user after determining that the dependency object does not include install script.

21. The article of manufacture of claim 17, wherein a plurality of dependency objects are provided for indicating a plurality of dependent components on which the program to install depends, further capable of causing the computer system to perform:

installing the program and file sets therein after processing the dependency object and determining that the dependent component is installed in the computer;

indicating in a data structure the installed program;

processing the dependency object to determine the dependent component from which the installed program depends; and indicating in the data structure the dependent component determined from the dependency objects for the installed program.

22. The article of manufacture of claim 21, further capable of causing the computer system to perform:

processing a command to remove the installed program from the computer;

processing the data structure to determine whether the installed program to remove is indicated as a dependent component;

determining from the data structure depending programs that depend upon the dependent components to operate in at least one respect; and indicating that the installed program cannot be removed until the determined depending programs are removed.

23. The article of manufacture of claim 22, further capable of causing the computer system to perform continuing with the removal of the installed program after determining that the installed program is not a dependent component for another installed program.

24. The article of manufacture of claim 17, wherein the dependency object further includes an operating system field indicating the operating system on which the program will be installed, wherein the determined operating system command depends upon the operating system indicated in the operating system field, and wherein executing the operating system command further comprises passing data from the dependency object to the operating system command as parameters, dependent on the type of operating system indicated in the operating system field.

25. A memory within a computer system for storing data for access by an installation program for installing a program onto the computer system, comprising:
- a dependency object stored in the memory indicating a dependent component on which the program to install depends, wherein the dependency object is processed before installing the program; and
- a plurality of operating system commands for different operating systems, wherein one of the operating system commands that is capable of executing in the operating system in which the program is being installed is executed to determine whether the dependent component indicated in the dependency object is installed in the computer, and wherein an indication is made that the dependent component is not installed after determining that the dependent component is not installed.

26. The memory of claim 25, wherein the dependency object further includes an install script to install the dependent component onto the computer, wherein the install script is enabled after determining that the dependency object for the dependent component is not installed on the computer, wherein a user may select to execute the enabled install script to install the dependent component.

27. The memory of claim 26, wherein the dependency object further includes a universal resource locator (URL), wherein a file at the URL is accessed and installed on the computer when executing the install script.

28. The memory of claim 26, wherein the dependency object is further capable of including install information, wherein the install script is enabled after determining that the install script is included in the dependency object and wherein the install information is presented to a user after determining that the dependency object does not include install script.

29. The memory of claim 25, wherein the memory further includes a plurality of dependency objects that are provided for indicating a plurality of dependent components on which the program to install depends, wherein the memory further includes a data structure indicating installed components and dependent components on which the installed components depend, wherein after installing the program and determining that the dependent components are installed in the computer, the data structure is updated to indicate the installed program, wherein the dependency objects are processed to determine the dependent components from which the installed program depends, and wherein an indication is made in the data structure of the dependent components determined from the dependency objects for the installed program.

30. The memory of claim 29, wherein the data structure indicates in a hierarchical relationship installed programs and at a lower hierarchical relationship to the installed program dependent components for the installed program.

31. The memory of claim 25, wherein the dependency object further includes an operating system field indicating the operating system on which the program will be installed, wherein an operating system command depends upon the operating system indicated in the operating system field, and wherein executing the operating system command further comprises passing data from the dependency object to the operating system command as parameters, dependent on the type of operating system indicated in the operating system field.

* * * * *